(12) United States Patent
Littau (10) Patent No.: US 7,938,892 B2
(45) Date of Patent: May 10, 2011

(54) PRODUCING ARTICLES THAT INCLUDE IONIC LIQUIDS

(75) Inventor: Karl Anthony Littau, Palo Alto, CA (US)

(73) Assignee: Palo Alto Research Center Incorporated, Palo Alto, CA (US)

(*) Notice: Subject to any disclaimer, the term of this patent is extended or adjusted under 35 U.S.C. 154(b) by 342 days.

(21) Appl. No.: 12/136,109

(22) Filed: Jun. 10, 2008

(65) Prior Publication Data

US 2009/0301297 A1    Dec. 10, 2009

(51) Int. Cl.
*B01D 53/22* (2006.01)

(52) U.S. Cl. .......... 96/5; 96/4; 96/10; 96/11; 96/12; 95/45; 95/51; 429/483; 429/499

(58) Field of Classification Search ........... 95/45, 46, 95/51, 230; 96/4, 5, 8, 10, 11, 12; 429/480, 429/482, 483, 498, 499, 500, 523, 524, 532; 502/159, 162; 204/242
See application file for complete search history.

(56) References Cited

U.S. PATENT DOCUMENTS

| | | | |
|---|---|---|---|
| 3,511,712 A | 5/1970 | Giner | |
| 3,676,220 A * | 7/1972 | Ward, III | 96/5 |
| 4,002,493 A | 1/1977 | Warszawski | |
| 4,117,079 A | 9/1978 | Bellows | |
| 5,258,106 A | 11/1993 | Habermann et al. | |
| 5,472,585 A | 12/1995 | Dinella et al. | |
| 5,597,863 A | 1/1997 | Linder et al. | |
| 6,579,343 B2 * | 6/2003 | Brennecke et al. | 95/51 |
| 6,673,737 B2 * | 1/2004 | Mehnert et al. | 502/159 |
| 6,793,711 B1 * | 9/2004 | Sammells | 95/48 |
| 6,969,693 B2 * | 11/2005 | Sauvage et al. | 502/159 |
| 2005/0154247 A1 * | 7/2005 | Jong et al. | 585/862 |
| 2006/0100323 A1 * | 5/2006 | Schmidt et al. | 524/106 |
| 2007/0119302 A1 * | 5/2007 | Radosz et al. | 96/5 |
| 2009/0159456 A1 | 6/2009 | Littau | |

(Continued)

FOREIGN PATENT DOCUMENTS

EP    1 935 476 A1    6/2008

(Continued)

OTHER PUBLICATIONS

Susan et al., "Ion Gels Prepared by in Situ Radical Polymerization of Vinyl Monomers in an Ionic Liquid and Their Characterization as Polymer Electrolytes", J. Am. Chem. Soc., 2005, 127, pp. 4976-4983.*

(Continued)

*Primary Examiner* — Jason M Greene
(74) *Attorney, Agent, or Firm* — Hollingsworth & Funk, LLC (57) ABSTRACT

Ionic liquids can be immobilized in a membrane by, for example, bonding to a support such as a matrix, or by inclusion within a gel. Immobilized ionic liquids can be used in a number of applications, such as separation of carbon dioxide or other gases from gas streams. Membranes can be included in electrochemical cells. For example, a membrane can contain sufficient immobilized ionic liquid to reduce ionic current density of at least one of protons and hydroxyl ions, relative to carbon-containing ionic current density. A gas stream containing carbon dioxide can be introduced on a cathode side, while a source of hydrogen gas can be introduced on the anode side of the membrane. Operation of an electrochemical cell with such a membrane can separate the carbon dioxide from the gas stream and provide it at a separate outlet.

23 Claims, 7 Drawing Sheets

U.S. PATENT DOCUMENTS

2009/0233155 A1    9/2009    Littau

FOREIGN PATENT DOCUMENTS

| JP | 63049232 | 3/1988 |
| WO | WO 2004/104548 A2 | 12/2004 |
| WO | WO 2005/061422 A1 | 7/2005 |

OTHER PUBLICATIONS

Winnick, J., Marshall, R.D., and Schubert, F.H., "An Electrochemical Device for Carbon Dioxide Concentration. I. System Design and Performance," Ind. Eng. Chem., Process Des. Develop., vol. 13, No. 1, 1974, pp. 59-63.

Scovazzo, P., Poshusta, J., Dubois, D., Koval, C., and Noble, R., "Electrochemical Separation and Concentration of <1% Carbon Dioxide from Nitrogen," Journal of the Electrochemical Society, vol. 150, No. 5, 2003, pp. D91-D98.

Sugiura, K., Takei, K., Tanimoto, K., Miyazaki, Y., "The carbon dioxide concentrator by using MCFC," Jour. of Power Sources, vol. 118, 2003, pp. 218-227.

Lang, C.M., Kim, K., and Kohl, P.A., "High-Energy Density, Room-Temperature Carbonate Fuel Cell," Electrochemical and Solid-State Letters, vol. 9, No. 12, 2006, pp. A545-A548.

Susan, A.B.H., Kaneko, T., Noda, A., and Watanabe, M., Ion Gels Prepared by in Situ Radical Polymerization of Vinyl Monomers in an Ionic Liquid and Their Characterization as Polymer Electrolytes, J. Am. Chem. Soc. 2005, vol. 127, p. 4976-4983.

Extended European Search Report dated Sep. 17, 2009, with Annex to the European Search Report on European Patent Application No. EP 09 16 1184.

Feb. 10, 2011, File History for U.S. Appl. No. 11/960,029 as retrieved from U.S. Patent and Trademark Office System on Feb. 10, 2011, 113 pages.

Feb. 10, 2011, File History for U.S. Appl. No. 12/049,0406 as retrieved from U.S. Patent and Trademark Office System on Feb. 10, 2011, 108 pages.

Feb. 10, 2011, File History for U.S. Appl. No. 12/168,953 as retrieved from U.S. Patent and Trademark Office System on Feb. 10, 2011, 125 pages.

Feb. 10, 2011, File History for EP Application No. 09164825.3 as retrieved from European Patent Office Electronic File System on Feb. 10, 2011, 112 pages.

Feb. 10, 2011, File History for EP Application No. 09161184.8 as retrieved from European Patent Office Electronic File System on Feb. 10, 2011, 97 pages.

2000, Sata, "Studies on Anion Exchange Membranes Having Permselectivity for Specific Anions in Electrodialysis—Effect of Hydrophilicity of Anion Exchange Membranes on Permselectivity of Anions", Journal of Membrane Science, vol. 167, 2000, pp. 1-31.

* cited by examiner

PRODUCING ARTICLES THAT INCLUDE IONIC LIQUIDS

FIELD

The techniques described herein relate generally to ionic liquids and, more specifically, to techniques that immobilize them.

BACKGROUND

Techniques have been proposed for attaching ionic liquids to structures. For example, U.S. Patent Application Publication No. 2007/0119302 describes polymeric materials that contain ionic groups, and that can be used as membranes and sorbents for separating gas components, such as $CO_2$, from flue gas and natural gas. A polymer can have a polymeric backbone and ionic liquid moieties attached to the backbone.

It would be advantageous to have improved techniques for using ionic liquids.

SUMMARY

The invention provides various exemplary embodiments, including structures, articles, and methods. In general, the embodiments involve ionic liquids.

These and other features and advantages of exemplary embodiments of the invention are described below with reference to the accompanying drawings.

DETAILED DESCRIPTION

In the following detailed description, numeric values and ranges are provided for various aspects of the implementations described. These values and ranges are to be treated as examples only, and are not intended to limit the scope of the claims. In addition, a number of materials are identified as suitable for various facets of the implementations. These materials are to be treated as exemplary, and are not intended to limit the scope of the claims.

As noted above, polymeric materials containing ionic groups may be used as membranes and sorbents for separating gas components, such as $CO_2$, from flue gas streams or natural gas streams. It is believed that the $CO_2$ is separated from the gas stream based on its solubility in the ionic liquid.

The implementations described herein address problems that arise in producing structures that include ionic liquids. For example, U.S. Patent Application Publication No. 2007/0119302 describes techniques that form membranes from polymers, either with individual monomers fabricated with attached ionic groups and then polymerized, or with ionic groups attached to free polymers. These and other previous techniques do not provide a sufficient range of possibilities for robust manufacturing implementations. In addition, such techniques may not provide a structure that can be used in an efficient electrochemical cell.

Implementations described herein address these problems in which ionic liquid is immobilized in a membrane by use of a gel or by bonding the ionic liquid to a matrix through one or more chemical reactions. The resulting articles may be used, for example, to separate carbon dioxide or other gas from gas streams. Sufficient ionic liquid can be immobilized to reduce ionic current density of protons and/or hydroxyl ions, resulting in improved efficiency.

The implementations described herein are generally useful for any application that could use a solid electrolyte and/or any application that is aided by the introduction of an electrolyte membrane that can optionally have ion exchange capability would benefit from these techniques. The term "solid electrolyte" is used to include not only standard solid materials, but also a polymer, gel, glass, or mixed phase material. Such applications include hydrogen fuel cells, methanol fuel cells, other fuel cells, electrolyzers, electrochemical sensors, Li ion batteries, other batteries, and any other applications where it is advantageous to have a physical, but ionically conductive, barrier. In these cases, the membrane would separate the anode and cathode compartments of these electrochemical systems. In the case where there are liquid electrolytes (e.g., water) in the anode and/or cathode compartments, the ionic liquid would preferably be chosen carefully so that neither it, nor any of its components, are soluble in the anodic and/or cathodic electrolytes. Otherwise, there is a risk of loss of the non-immobilized portion of the ionic liquid electrolyte through diffusion or ion exchange.

In one exemplary application, the implementations described herein could be used in carbon dioxide gas separation. Carbon dioxide is the main constituent of heat trapping gases responsible for accelerated climate change. Methods for efficiently extracting $CO_2$ directly from the atmosphere could enable cost effective sequestration or conversion of $CO_2$ to hydrocarbons suitable for use as fuel while still being carbon neutral.

Figure 1:
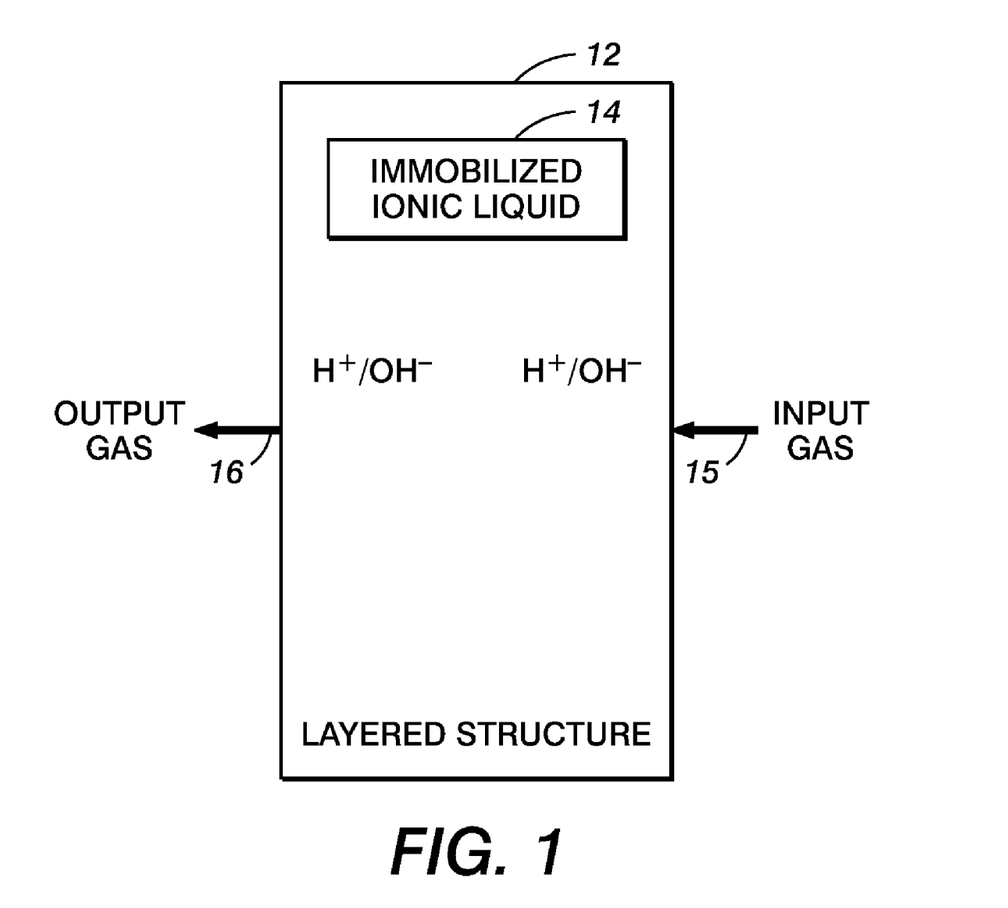
FIG. 1 is a schematic diagram illustrating general features of an article that includes immobilized ionic liquid.

FIG. 1 shows a layered structure 12 that includes one or more layers, each of which could be a matrix, membrane, gel, or similar structure. The immobilized ionic liquid 14 is within layered structure 12, and in general, should span the entire layered structure 12. As will be described in more detail below, immobilized ionic liquid 14 may be implemented by, for example, bonding the ionic liquid to the matrix in the layered structure or membrane, or restricting its movement within a gel. In general, the ionic liquid is configured to be sufficient to reduce the relative ionic current density of at least one of protons and hydroxyl ions (represented by $H^+$ and $OH^-$). More than one ionic liquid may be present depending on the desired application. At least a portion of the ionic liquid should be immobilized within layered structure 12. For example, the ionic liquid may be immobilized on the basis of charge (either cations are immobilized or anions are immobilized) or on the basis of size (larger ions are immobilized or smaller ions are immobilized). In application, an input gas (per arrow 15) would be input on one side of layered structure 12 and a resulting output gas (per arrow 16) would leave on the opposite side of layered structure 12.

The ionic liquids used with the implementations described herein are in general are room temperature ionic liquids, that is, ionic liquids that are in liquid form at room temperature. While such room temperature ionic liquids have demonstrated utility with the implementations described herein, those of ordinary skill in the art may recognize other ionic liquids that are not necessarily room temperature ionic liquids that may also be useful. Room temperature ionic liquids have negligible vapor pressure and are good ionic conductors. Many room temperature ionic liquids are miscible with water including some that are hygroscopic which aids in applications that require the presence of water; however, the liquids maintain their physical and electrochemical properties even in anhydrous conditions making them very robust even in environments with low humidity. Functionalizing room temperature ionic liquids with appropriate buffering or charged groups and optionally binding them to a matrix enables the liquids to have appropriate anion specific conductance and reduced hydroxyl diffusion. In this way, they may be used to promote carbon dioxide transport.

For implementations where the ionic liquids are partially immobilized, useful ionic liquids include those that have a low viscosity below about 50 cps and are at least partly miscible with water. When the ionic liquids are fully immobilized, the viscosity of the ionic liquid is irrelevant. In some implementations, it is advantageous to have the ionic liquids exclude water. Examples of useful ionic liquids include those formed from 1-butyl-1-methylpyrrolidinium dicyanamide, 1-ethyl-3-methylimidazolium trifluoromethanesulfonate, N-butyl-3-methylpyridinium dicyanamide, 1-butyl-3-methylimidazolium dicyanamide, 1-ethyl-3-methylimidazolium thiocyanate, 1-ethyl-3-methylimidazolium trifluoroacetate, and the like, including liquid ionic compounds described in U.S. Pat. No. 6,579,343, incorporated herein by reference. Ionic liquids containing dissolved Group I and Group II carbonate or bicarbonate salts would be particularly useful in carbon dioxide separation. Other soluble carbonate salts would also be useful in such an implementation. 1-Butyl-3-methylimidazolium tricyanomethane is partially miscible in water and may be useful; 1-Butyl-1-methylpyrrolidinium bis (trifluoromethylsulfonyl)imide has a viscosity of about 70 cps and may also be useful with the implementations described herein. In certain embodiments, the ionic liquids may be hygroscopic. The ionic liquids are generally electrochemically stable at the potentials typical in an electrochemical $CO_2$ concentrator and many other electrochemical applications, such as in a fuel cell.

Figure 2:
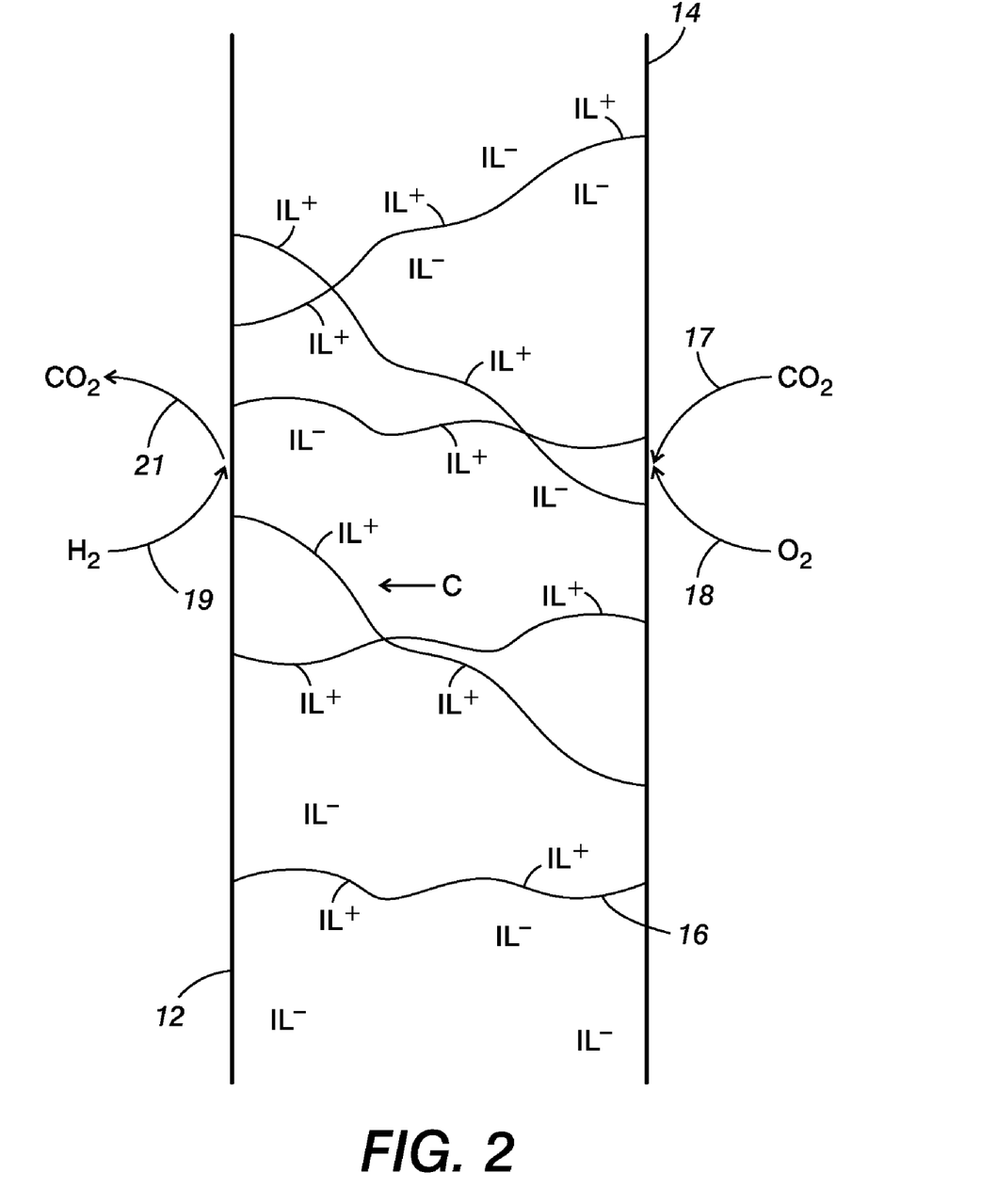
FIGS. 2-3 are schematic views of the flow of molecules and ions in separating carbon dioxide, such as within an electrochemical cell.

FIG. 2 shows an implementation of the layered structure of FIG. 1. The layered structure may be a part of an electrochemical cell having, for example, an anode and cathode. The side of the cell with the cathode 14 is configured as the basic side of the cell, while the side with the anode 12 is configured as the acidic side of the cell. A gas, such as air, containing both $CO_2$ (per arrow 17) and $O_2$ (per arrow 18) is introduced at the cathode 14. In the region between anode 12 and cathode 14, ionic liquids $IL^+$ and $IL^-$ (depending on whether the particular ions in that region are cations or anions) move about a support structure 16. Support structure 16 may be a porous membrane or similar material, such as cellulose.

While FIG. 2 shows hydrogen gas as the fuel for the reactions, any hydrogen-containing molecule may be used that, when consumed at the anode, produces protons. Examples of such materials include methanol and other alcohols, metal hydrides, and methane or other simple hydrocarbon compounds.

In FIG. 2, on the basic side at the cathode, $O_2$ reacts with $H_2O$ and $2e^-$ to form $OH^-$, and $CO_2$ reacts with $OH^-$ to form a carbon-containing ion, represented by C. C can be any carbon-containing constituent known to those of ordinary skill in the art, such as carbonate or bicarbonate ion.

For $CO_2$ separation, C will typically be carbonate or bicarbonate ion; $CO_2$ may react with other species to produce other carbon-containing ions. Hydrogen gas (per arrow 19) is fed to the cell at the anode 12 where it forms $H^+$ and $e^-$. The carbon-containing ion C travels or transports across the cell to the acidic side at the anode 12 where it reacts with $H^+$ to form $CO_2$ again. The newly formed $CO_2$ (per arrow 21) is liberated at the anode 12. For example, the reactions may be characterized as follows:

| Anode: | Cathode: |
|---|---|
| $H_2 \rightarrow 2H^+ + 2e^-$ | $\frac{1}{2}O_2 + H_2O + 2e^- \rightarrow 2OH^-$ |
| $HCO_3^- + H^+ \rightarrow H_2O + CO_2$ | $CO_2 + OH^- \rightarrow HCO_3^-$ |

The cathodic and anodic reactions rely on the differential solubility of $CO_2$ and $CO_2$-related carbon-containing species at different pH levels and operate independently of electrode potential. Without the ionic liquid, $H^+$ and $OH^-$ tend to diffuse across the cell. The membrane includes sufficient ionic liquid to selectively reduce at least one of $H^+$ and $OH^-$ ionic current density, relative to the ionic current density of the carbon-containing ions. The ions that are transported across the cell complete the circuit between the anode and the cathode. The relative ionic current density of the various species can be measured at each electrode to determine the relative current density of each. It is thus believed to reduce diffusion of at least one of $H^+$ and $OH^-$ across the cell, while permitting or promoting carbon-containing ion transport. This can be confirmed by measuring Faradaic efficiency, as described below for example.

FIG. 2 shows an implementation wherein the cations $IL^+$ are immobilized. The immobilized ionic liquid is held within a particular region or layer by immobilization to a support 16. The ionic liquid may be partially or completely immobilized. The system can be designed to configure the immobilization as desired for the particular circumstances. For example, the immobilization may be by charge (as shown in FIG. 2) or by the size of the ions, such as when larger ions are immobilized and smaller ions are free to move, or by similar techniques.

In FIG. 2, the cations $IL^+$ are shown covalently bonded to the support 16. To achieve this implementation, the system would be designed so that the cations $IL^+$ react with the support 16. Such systems could be configured, for example, using techniques as described in U.S. Patent Application Publication No. 2007/0119302, incorporated herein by reference. Other examples of such reactions include photo-induced cross-linking of the ions with the support 16 or reactions of an amine group with a carboxylic acid.

As noted, one method of immobilizing the ionic liquid to the support 16 would be a preferential cross-linking reaction. Such a reaction would permit the ionic liquid to react with the support 16, while keeping it from reacting with itself or other ionic liquids present in the system. The linking reaction causes a chemical bond between the ionic liquid and the support 16.

An example of a cross-linking reaction that may be useful with the implementations described herein is as follows. The reaction includes an N-Hydroxysuccinimide-esters (NHS-esters).

Group A with a primary or secondary amine+group B with an NHS ester→A-CO—NH—B+NHS byproduct In this case, group A and B could be the ionic liquid cation (or anion) and the corresponding group would be the polymer matrix. There are many other such specific cross-linking reactions that can be used depending on the specific constituents involved, i.e., the desired ionic liquid to be immobilized and the specific support or matrix to which it will be immobilized. For example, other linking reactions may be used to link amines with imidoesters, aldehydes with hydrazides, and carboxylates with amines. These, and other such specific linking reactions, may be used as known to those of ordinary skill in the art.

Figure 3:
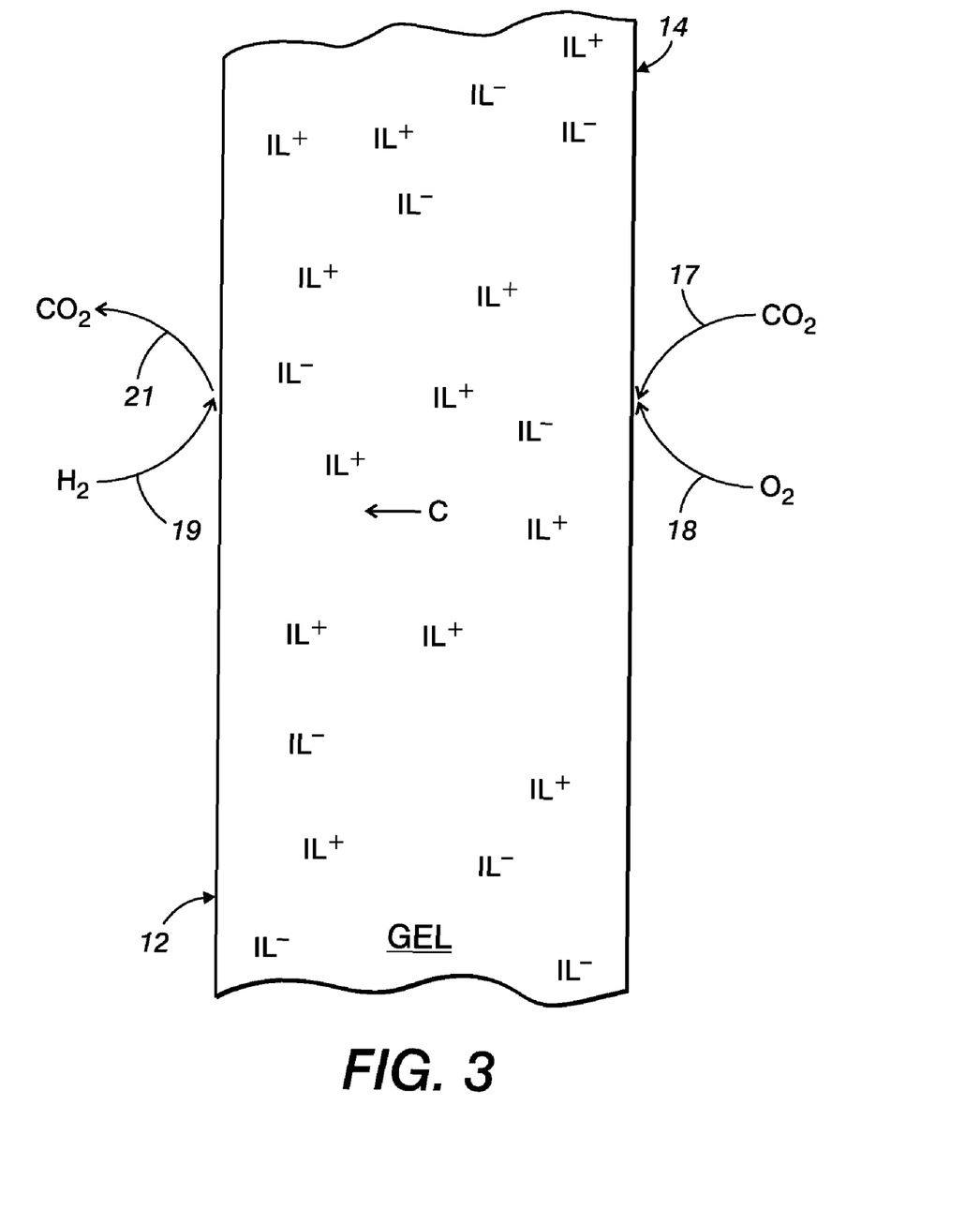

FIG. 3 shows another implementation of a system having immobilized ionic liquid. In this implementation, a gel may be used to provide complete or partial immobilization of the ionic liquid. Generally, the gel does not react with the ionic liquid, but instead may immobilize the ions based on size. Larger ions are held in place, while smaller ions are free to move about the system. If all of the ions are large, all ions of the ionic liquid may be held in place. Typically, the carbon-containing ion is free to move within the system to achieve the desired gas separation. It is believed that, with sufficient ionic liquid, a gel as in FIG. 3 would reduce proton or hydroxyl ion current density, and thus diffusion across the cell, relative to carbon-containing ion current. It is common that the cations of an ionic liquid are much larger than the anions. In such a case, the cations could be selectively immobilized based on their larger size rather than their positive charge directly. The membrane would have the character of both ionic liquid and ion exchange, similar to an anion exchange membrane.

The gel may be implemented in a number of different ways. One method would be to cast a membrane using a formulation that contains the ionic liquid. Another alternative would be to penetrate a matrix with a monomer mixture that includes ionic liquid. For example, a monomer mixture of acrylamide and Immobiline™ monomers could penetrate a cellulose matrix and the matrix could then be cured to immobilize the matrix.

Similar to FIG. 2, FIG. 3 shows a gas, such as air, containing both $CO_2$ (per arrow 17) and $O_2$ (per arrow 18) that is introduced at the cathode 14. In the region between anode 12 and cathode 14, ionic liquid $IL^+$ and $IL^-$ are immobilized within the gel. For $CO_2$ separation, C will typically be carbonate or bicarbonate ion; $CO_2$ may react with other species to produce other carbon-containing ions. Hydrogen gas (per arrow 19) is fed to the cell at the anode 12 where it forms $H^+$ and $e^-$. The carbon-containing ion C travels across the cell to the acidic side at the anode 12 where it reacts with $H^+$ to form $CO_2$ again. The newly formed $CO_2$ (per arrow 21) is liberated at the anode 12.

Figure 4:
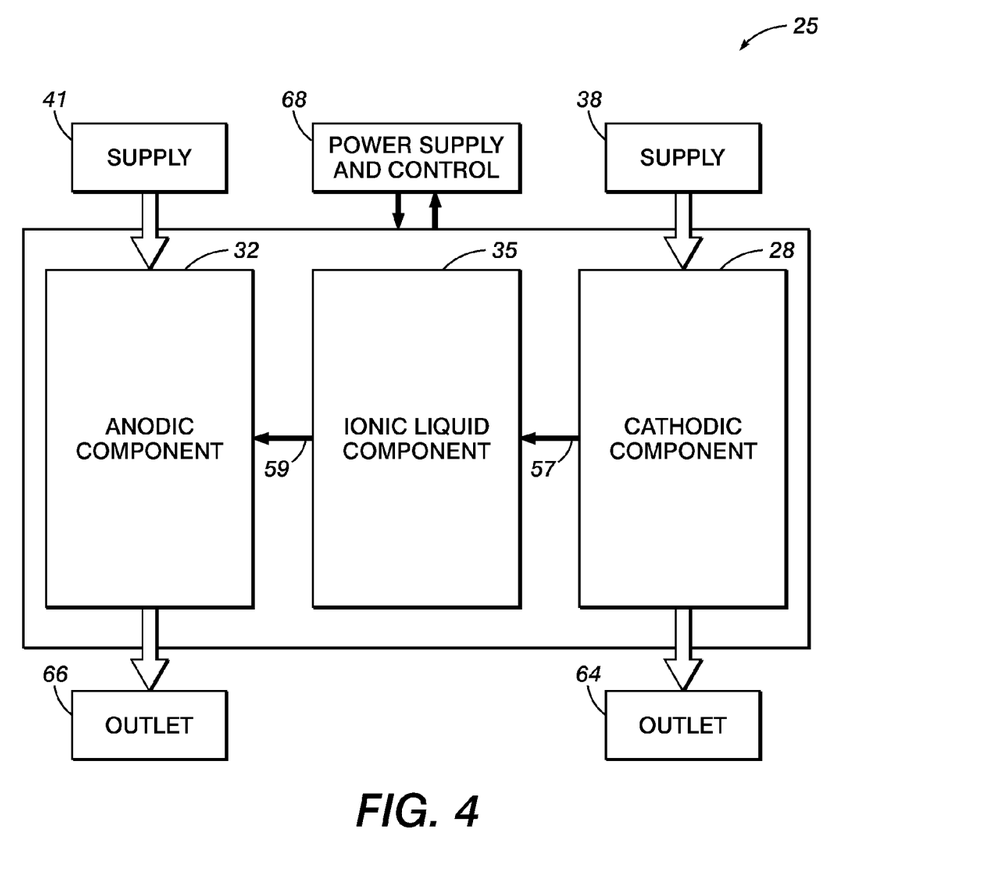
FIG. 4 is a schematic block diagram of a system in which molecules and ions can flow as in FIGS. 2-3.

FIG. 4 shows system 25 in which ionic liquid component 35 selectively reduces $H^+$ and $OH^-$ ionic current density across the cell, relative to carbon-containing ionic current density. It is thus believed that the ionic liquid component 35 reduces $H^+$ and $OH^-$ transport, while permitting or promoting carbon-containing ion transport. System 25 includes supply 38 and outlet 64 at cathodic component 28 and supply 41 and outlet 66 at anodic component 32. In operation, a gas that includes carbon dioxide is introduced to cathodic component 28 from supply 38, while hydrogen gas is introduced to anodic component 32 from supply 41. The gas with reduced carbon dioxide content is released from cathodic component 28 through outlet 64. Carbon-containing ions transfer from cathodic component 28 to ionic liquid component 35 as shown by arrow 57, and from ionic liquid component 35 to anodic component 32 as shown by arrow 59. The carbon-containing ions react at anodic component 32 to form carbon dioxide gas that exits system 25 through outlet 66. In a typical embodiment, system 25 also includes load and control 68 to provide electrical load across components 28 and 32 and to control any other electrical components, such as valves, pumps, and so forth.

Ionic liquid component 35 includes ions that are configured, such as in one of the ways described above, to promote the reactions in the system for the separation of carbon dioxide, so that the reactions are more efficient than if the ionic liquid was absent. In some implementations, the ions can be immobilized on a matrix or other structure by bonding or the like. The ionic liquid component 35 should contain sufficient ionic liquid to permit carbon-containing ion diffusion or transport while reducing ionic current density of protons and hydroxyl ions relative to the current density of carbon-containing ions. Thus, the ionic liquid is believed to reduce diffusion of protons and hydroxyl ions.

Figure 5:
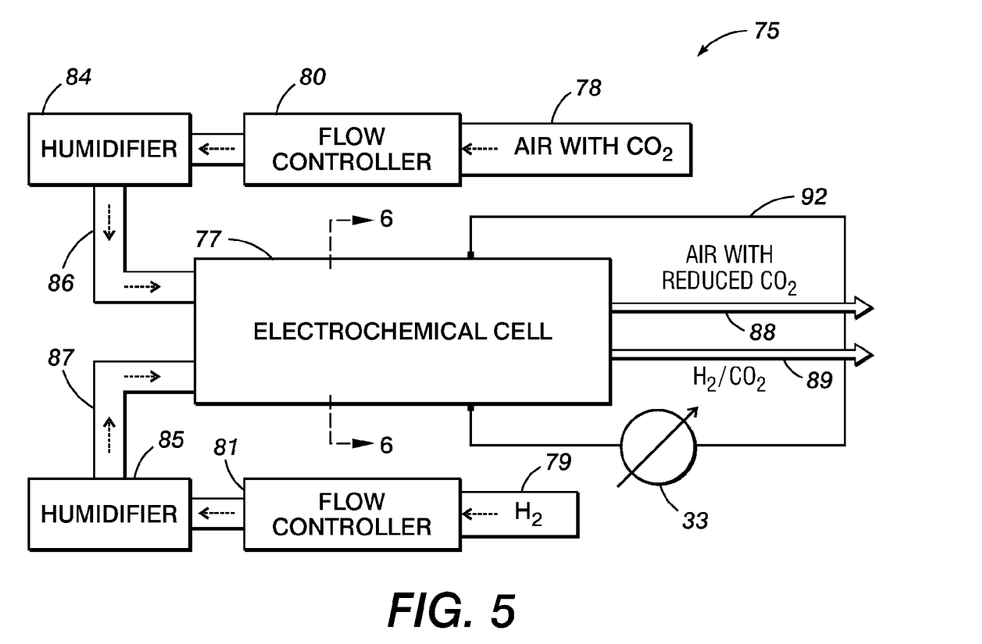
FIG. 5 is a schematic view showing flow paths of gases in a system as in FIG. 4.

FIG. 5 shows system 75, an exemplary implementation of system 25 in FIG. 4. In this implementation, air containing carbon dioxide flows through tube 78. Although FIG. 5 shows the inlet gas being air, other gases containing carbon dioxide could also be used, such as exhausts from industrial processes. On the other side, hydrogen gas flows into the system 75 through tube 79. Each gas stream flows through a respective flow controller 80 or 81 and, optionally, through a respective humidifier 84 or 85 that controls the relative humidity of the gas stream. Ionic liquid systems do not require a great deal of humidity to function efficiently. Thus, the humidification step is optional. From there, the humidified gas streams flow in parallel through respective tubes 86 and 87 into electrochemical cell 77 where the carbon dioxide is separated from the air. Two outlets 88 and 89 are shown from system 75. Reduced carbon dioxide air flows through one outlet 88, while carbon dioxide and excess hydrogen that is not consumed during the process flow out through the other outlet 89. Variable load 33 is attached to electrochemical cell 77 to form circuit 92 that controls the power to electrochemical cell 77. In operation, load 33 to circuit 92 regulates the extent to which $H_2$ is permitted to generate an electrical circuit within electrochemical cell 77. Variable load 33 may be a battery or other energy storage or conversion device. In this case, variable load 33 is being charged rather than discharged.

Figure 6:
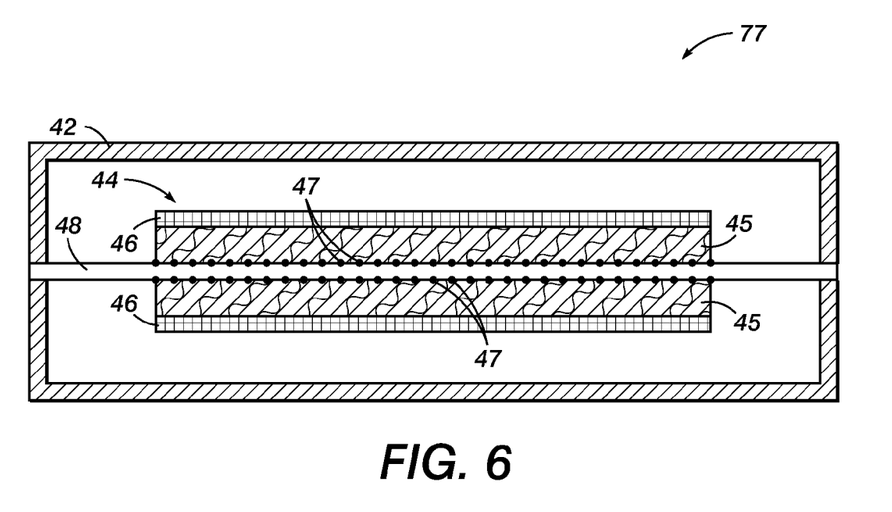
FIG. 6 is a cross-sectional view of the electrochemical cell as in FIG. 5 taken along line 4-4 of FIG. 5.

FIG. 6 shows a cross-section of electrochemical cell 77, an exemplary implementation of cell 77 in FIG. 5. Layered structure 44 is shown within enclosure 42 that can be metal or similar material.

Membrane 48 that includes ionic liquid is clamped or otherwise fixed in place within the enclosure 42 with tubes 86 and 88 connected on one side of membrane 48 and tubes 87 and 89 connected on the other, the tubes being shown in FIG. 5. The membrane may be a polymer, porous cellulose, expanded polytetrafluoroethylene, glass fibers, or other porous materials.

Catalyst layers 47 formed of platinum particles or other material known to those of ordinary skill in the art are located on either side of membrane 48. Examples of other catalyst materials include nickel and palladium. The catalyst layers increase the efficiency of the system by increasing the amount of $H^+$ and $OH^-$ within the system. The catalyst increases the rate of the fuel reaction of $H_2 -> 2H^+ + 2e^-$. Any material known or discovered to increase the rate of this reaction may be used as the catalyst. The catalyst layers 47 may be applied by painting, air brushing, or printing.

Gas diffusion layers 45 are located on either side of membrane 48 and catalyst layers 47. The gas diffusion layers permit the gases to diffuse through the pores therein from each of porous conductive layers 46 (described below) to membrane 48. The gas diffusion layers can be formed of a porous electrically conductive material such as carbon paper or carbon cloth and may be infused with a polymer, such as polytetrafluoroethylene (PTFE), in order to help prevent excess water accumulation in the gas diffusion layer.

The reactions that form the carbon-containing ion on the cathode side and for re-forming carbon dioxide gas on the anode side take place at the interface of the gas diffusion layers and the membrane. These reactions do not require the presence of the catalyst or any external applied potential. The platinum catalyst increases the efficiency of the hydrogen-containing molecule and oxygen gas consumption. Carbon-containing ion formation can be aided by the presence of other catalysts including both enzymatic catalysts, such as carbonic anhydrase, or inorganic catalysts. Either layers of porous conductor material 46 or a metal plate acting as a flow field (described below) are located on either side of the gas diffusion layers 45. The porous conductors can be formed of a material that conducts electricity and permits gas diffusion, such as a wire mesh, expanded metal, or similar material.

A metal plate with machined gas channels acting as a "flow field," such as are commonly used in fuel cells, may also be used in place of the porous conductor material 46. For example, a flat plate of stainless steel with machined grooves having an inlet at one end and outlet at the other may be used. The grooved surface is placed against the gas diffusion layer defining channels where the gas passes over the gas diffusion layer. This is commonly referred to as the "flow field" in fuel cell art.

As reactions progress at catalyst layers 47, the interfaces of the catalyst layers 47 with the gas diffusion layer 45 and membrane 48 behave similarly to electrodes, with one behaving like a cathode and the other like an anode. In operation, an electric field is therefore formed across membrane 48 between catalyst layers 47 at the interfaces of gas diffusion layers 45 and membrane 48.

Membrane 48 can be implemented by immobilizing ionic liquid in a suitable structure or by simply soaking membrane 48 in an ionic liquid to cause the chemical reactions to occur. Sufficient amount of ionic liquid should be used within membrane 48 to permit transport of carbon-containing ions while reducing relative ionic density of protons and hydroxyl ions. In this way, the ionic liquid is believed to reduce diffusion of protons and hydroxyl ions in the system. The ionic liquid also may need to fill substantially all of the pores of the matrix sufficiently to prevent direct gas transport through the pores. For example, ionic liquids can be immobilized by fixing them to a structure such as a polymer, matrix, or other permeable or semi-permeable membrane, including as an example ion exchange membranes using techniques similar to those disclosed in U.S. patent application Ser. No. 11/960,029, filed Dec. 19, 2007, the contents of which are incorporated herein by reference. The ion exchange membrane described in the '029 application could be soaked in ionic liquid prior to or simultaneously with chemical reactions that cause bonding of the ionic liquid to the membrane. The ionic liquid keeps the membrane moist and prevents it from drying out. The immobilized ionic liquid could also be used with ionic liquids that may not be immobilized but are simply supported on a membrane or other matrix, including as an example techniques similar to that disclosed in U.S. patent application Ser. No. 12/049,406, filed Mar. 17, 2008, the contents of which are incorporated herein by reference.

Figure 7:
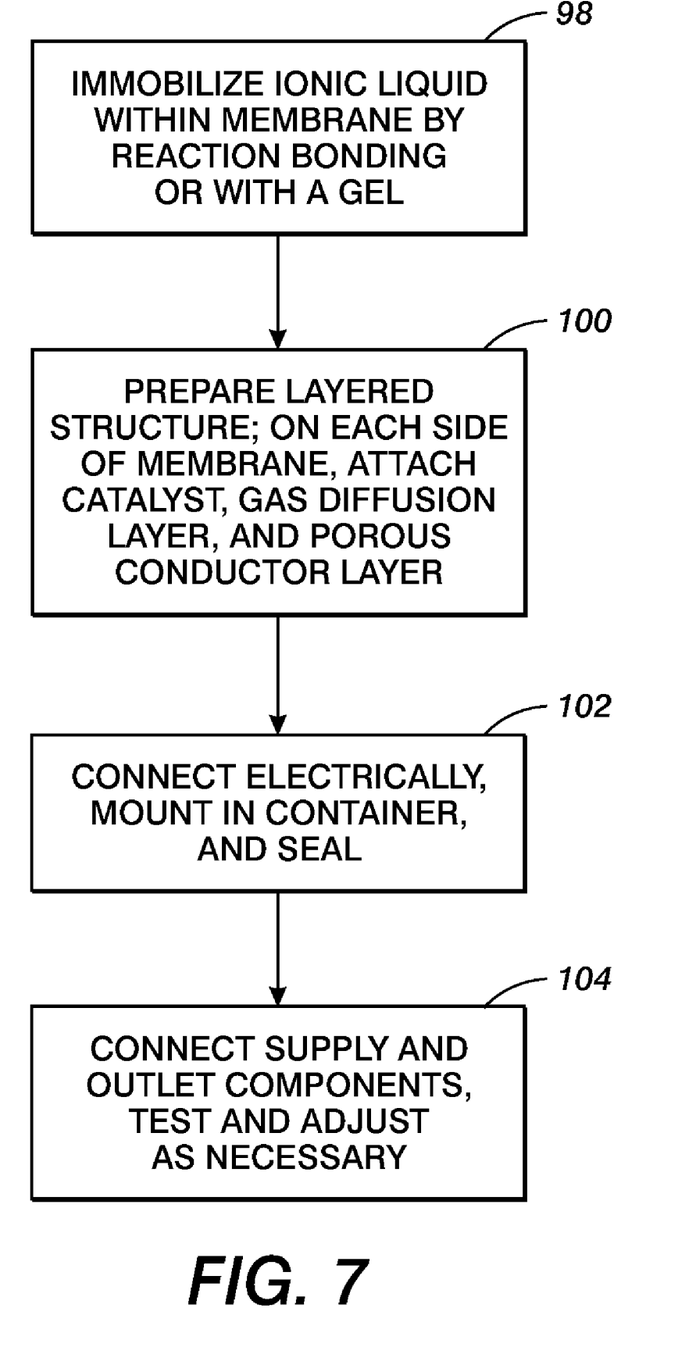
FIG. 7 is a block diagram showing a process for producing a system as in FIGS. 5 and 6.

FIG. 7 shows exemplary steps that can produce a system like those disclosed herein. In the operations in box 98, ionic liquid may be immobilized in a membrane. The ionic liquid could be immobilized within the membrane by reacting with a matrix or matrix layer in the membrane to form a bond or by inclusion within a gel in the membrane. The remaining steps shown in FIG. 7 are optional and may be used as particular applications dictate. In the operation in box 100, a layered structure can be prepared from a membrane. On each side of the membrane, the catalyst, gas diffusion layer, and porous conductor layer are attached. In the operations in box 102, the system is connected electrically, mounted in a container, and sealed. Finally, in an operation in box 104, the supply and outlet components are connected. The system can be tested and adjusted as necessary.

The particular order of any of the steps for preparing the various components of the system is not critical. Indeed, they can be performed in any appropriate order. For example, in FIG. 6, although the layered structure 44 is described as being prepared as a catalyst layer 47 covering the membrane 48, it could just as easily be constructed as the catalyst layer 47 covering the gas diffusion layer 45 which is then attached to the membrane 48. The catalyst layer 47 need not be present as a complete layer at all, but must simply be present in sufficient quantity and thickness to facilitate the desired chemical reactions.

If necessary or desirable, the system can easily be designed to permit control of the temperature and pressure of the various gases as they move throughout. A gas analyzer may be used to test the various outlet gases to determine whether the system is operating as desired. The outlet gases may be used in any application desired. The outlet gases may be pumped to another location or used in reactions or other applications nearby.

Faradaic efficiency is a measure of how effectively electrical current in the electrochemical cell is used. High Faradaic efficiencies suggest that the process requires lower electrical current to complete the reaction making the process more feasible. In this case, Faradaic efficiency is a measure of the ratio of $CO_2$ capture rate over the electric current through the system. A Faradaic efficiency of 100% means exactly one $CO_2$ molecule is captured for every electron passing through the system (one hydrogen molecule makes two electrons).

As used herein, the term "bond" refers to a chemical bond between two or more atoms, molecules, or ions that generally results from a chemical reaction. While a chemical reaction is generally referred to as a process that results in the breaking or forming of bonds, in this case, the reactions generally result in the formation of bonds, for example, between an ionic liquid and a matrix. Examples of bonds include covalent bonds and ionic bonds.

As used herein, the term "matrix" refers to a polymer, resin, or other material structured so that it can support ionic liquid. For example, cations or anions of the ionic liquid may be bonded to or within a matrix.

As used herein, the term "ionic liquid" refers to a liquid that contains essentially only ions. The term "room temperature ionic liquid" generally refers to salts having a melting point below about 100° C., such that they are generally in liquid is form at room temperature.

To "immobilize" an ionic liquid means to keep the ions in place relative to movable ions and molecules around it, i.e., to prevent them from moving as the ions and molecules move. Cations or anions may be immobilized separately, while the counter-ions are free to move. Immobilization may also be implemented by size of the ions with large ions immobilized and small ions free to move. Immobilizing does not refer to complete lack of movement, but to reducing movement measurably from its level without any immobilization. For example, there may still be a small amount of movement of the layers and thus of the ions within the cell. Immobilizing the ionic liquid may be accomplished by bonding or fixing the ions such as to a matrix or similar structure or by confining them within a relatively small region at a structure.

As used herein, a "layer" is a thickness of material, whether or not patterned in any way. A layer "includes" a specified type of material if material of the specified type is present in any part of the layer; a layer is "of" a specified type of material if material of the specified type is predominant throughout the layer. A layer may be homogeneous or its composition or characteristics may vary. A layer may include two or more layers or parts of layers within it, sometimes referred to as "sublayers." An "insulating layer" is a layer that is electrically insulating, while a "conductive layer" is a layer that is electrically conductive.

A "layered structure" refers herein to a structure that includes layers.

The term "membrane" refers to a structure that is permeable to fluids, such as gas, liquid, or aerosol. A membrane may be "semipermeable," meaning that it is permeable to some substances and impermeable to others. A membrane may include one or more layers of matrix.

The term "gel" refers to a fibrous and/or cross-linked matrix (usually polymeric and cross-linked through a weakly interacting force such as a hydrogen bonded matrix) which may include a substantial fraction of water or other solvent retained or held within the matrix.

The terms "cathodic component" and "anodic component" refer, respectively, to structures or materials that act as electrodes and from which positive or negative electric current flows. A "cathodic component" can include an area in which reduction occurs, while an "anodic component" can include an area in which oxidation occurs.

The term "electrochemical cell" refers to a vessel where chemical reactions take place by the releasing and accepting of electrons or that produces a voltage from chemical reactions taking place therein involving the releasing or accepting of electrons.

"Carbon-containing ions" simply refer to ions that contain the element carbon. They may be anions or cations with the ionization occurring on the carbon atom or on another atom within the ion.

The term "ionic current density" refers to the total net charge transported by ions across a surface per unit area and time. For example, if $6.24 \times 10^{18}$ carbonate atoms (one coulomb) were transported across a membrane of 1 $cm^2$ in one second and each carbonate ion carried a −2 charge, the ionic current density would be 2 Amps/$cm^2$.

Although the invention has been described herein primarily for the separation of carbon dioxide from other gases, the invention is not so limited. As understood by those of ordinary skill in the art, the system described could be used to separate other gases.

While the invention has been described in conjunction with specific exemplary implementations, it is evident to those skilled in the art that many alternatives, modifications, and variations will be apparent in light of the foregoing description. Accordingly, the invention is intended to embrace all other such alternatives, modifications, and variations that fall within the spirit and scope of the appended claims.

What is claimed is:

1. An article comprising:
   a layered structure having one or more layers and an ionic liquid within the layered structure, wherein the layered structure includes at least one of
   a support layer having at least some of the ionic liquid bonded thereto, and configured to reduce the ionic current density of at least one of protons and hydroxyl ions; and
   a gel containing at least a portion of the ionic liquid, the gel configured to reduce the ionic current density of at least one of the protons and hydroxyl ions.

2. The article of claim 1, wherein the layered structure includes the gel and the gel is configured to reduce the ionic current density of at least one of protons and hydroxyl ions relative to the ionic current density of at least one other ion within the gel, wherein the at least one other ion comprises a carbon containing ion.

3. The article of claim 1, wherein the layered structure includes the support layer and the ionic liquid includes cations that are bonded to the support layer.

4. The article of claim 1, wherein the layered structure includes the support layer and the support layer includes one or more polymers.

5. The article of claim 1, wherein the layered structure includes the gel and the gel includes one or more polymers.

6. An article comprising a membrane that includes a permeable support layer and one or more ionic liquids immobilized within the support layer; in operation, the ionic liquids reducing the ionic current density of at least one of protons and hydroxyl ions.

7. The article of claim 6, wherein the support layer further includes a gel and at least a portion of the ionic liquid is immobilized within the gel.

8. The article of claim 7, wherein the gel includes one or more polymers.

9. The article of claim 6, wherein at least a portion of the ionic liquid is bonded to the permeable support layer.

10. The article of claim 9, wherein the ionic liquid includes cations that are bonded to the support layer.

11. The article of claim 6, wherein the support layer and the support layer includes one or more polymers.

12. A method comprising:
   producing an article that includes a layered structure and an ionic liquid bonded to a matrix within the layered structure;
   wherein the act of producing the article comprises reacting the ionic liquid with the matrix so that a sufficient portion of the ionic liquid is bonded to the matrix to reduce the ionic current density of at least one of protons and hydroxyl ions.

13. The method of claim 12, wherein the act of reacting results in cations bonded to the matrix.

14. A method comprising:
   producing an article that includes a layered structure and an ionic liquid within a gel in the layered structure;
   wherein the act of producing the article comprises producing the gel with a portion of the ionic liquid held in place within the gel and a sufficient amount of the ionic liquid is within the gel to reduce the ionic current density of at least one of protons and hydroxyl ions.

15. The method of claim 14, wherein the act of producing, the article comprises at least one of:
   casting the gel from a formulation that contains the ionic liquid; or
   penetrating the gel with a monomer mixture that includes the ionic liquid.

16. The method of claim 15, wherein sufficient ionic liquid is-within the gel to-reduce the ionic current density of at least one of protons and hydroxyl ions relative to the ionic current density of carbon containing ions within the gel.

17. The article of claim 2, wherein the carbon containing ions comprise one or more of carbonate and bicarbonate.

18. The method of claim 12, wherein the ionic liquid fills pores of the matrix sufficiently to prevent direct gas transport through the pores.

19. The method of claim 16, wherein the gel immobilizes ions of the ionic liquid based on size of the ions of the ionic liquid.

20. The method of claim 12, wherein producing the article comprises selecting the ionic liquid that is at least partly miscible with water and has a viscosity less than about 100 cps.

21. The method of claim 14, wherein producing the article comprises selecting the ionic liquid that is at least partly miscible with water and has a viscosity less than about 100 cps.

22. The article of claim 1, wherein the ionic liquid is at least partly miscible with water and has a viscosity less than about 100 cps.

23. The article of claim 22, wherein the ionic liquid comprises one or more of 1-butyl-1-methylpyrrolidinium dicyanamide, 1-ethyl-3-methylimidazolium trifluoromethanesulfonate, N-butyl-3-methylpyridinium dicyanamide, 1-butyl-3-methylimidazolium dicyanamide, 1-ethyl-3-methylimidazolium thiocyanate, and 1-ethyl-3-methylimidazolium trifluoroacetate.

\* \* \* \* \*